(12) United States Patent
Kim et al.

(10) Patent No.: US 7,869,518 B2
(45) Date of Patent: Jan. 11, 2011

(54) FAST MOTION ESTIMATION APPARATUS AND METHOD USING BLOCK MATCHING ALGORITHM

(75) Inventors: Byung Gyu Kim, Busan (KR); Pyeong Soo Mah, Daejeon (KR); Seon Tae Kim, Daejeon (KR); Suk Kyu Song, Busan (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1499 days.

(21) Appl. No.: 11/243,095

(22) Filed: Oct. 4, 2005

(65) Prior Publication Data

US 2006/0280248 A1    Dec. 14, 2006

(30) Foreign Application Priority Data

Jun. 14, 2005 (KR) ............... 10-2005-0051088

(51) Int. Cl.
*H04N 7/12* (2006.01)
(52) U.S. Cl. .................. 375/240.16; 348/699
(58) Field of Classification Search ............ 375/240.16
See application file for complete search history.

(56) References Cited

U.S. PATENT DOCUMENTS

| | | | |
|---|---|---|---|
| 6,563,874 B1 | 5/2003 | Lu | |
| 6,590,937 B1 | 7/2003 | Ogura et al. | |
| 6,671,319 B1 | 12/2003 | Chang et al. | |
| 7,072,398 B2* | 7/2006 | Ma | 375/240.16 |
| 7,675,974 B2* | 3/2010 | Kawashima | 375/240.16 |
| 2002/0114394 A1* | 8/2002 | Ma | 375/240.16 |

(Continued)

FOREIGN PATENT DOCUMENTS

KR    100286818    1/2001

OTHER PUBLICATIONS

Yao Nie, Kai-Kuang Ma, "Adaptive rood pattern search for fast block-matching motion estimation", Image Processing, IEEE Transactions on, Dec 2002, vol. 11 , No. 12, pp. 1442-1449, ISSN : 1057-7149.*

(Continued)

*Primary Examiner*—Sath V Perungavoor
(74) *Attorney, Agent, or Firm*—Ladas & Parry LLP

(57) ABSTRACT

A fast motion estimation apparatus and method in which motion estimation is carried out on a current block of a current frame of video image data with reference to a corresponding matching block of a previous frame are provided. The fast motion estimation apparatus includes: a determination unit which determines whether an SAD between pixel values of a current block of a current frame and a corresponding matching block of a previous frame is greater than a predefined threshold; an initial search unit which performs an initial search when the SAD is greater than the predetermined threshold to find which search point of a current search pattern is the minimal SAD point and to determine whether the minimal SAD point matches the center of the current search pattern; and a repetitive search unit which performs an iteration search when the minimal SAD point differs from the center of the current search pattern to reset the minimal SAD point to be a center of the current search pattern and to set a number of search points and the size of a search pattern based on from current search pattern to a center of the search window of the previous frame.

11 Claims, 13 Drawing Sheets

U.S. PATENT DOCUMENTS

2008/0181310 A1*  7/2008  Choi et al. ............. 375/240.16

OTHER PUBLICATIONS

Chun-Ho Cheung, Lai-Man Po, "A novel rood-diamond search algorithm for fast block motion estimation", Acoustics, Speech, and Signal Processing, 2002. Proceedings. (ICASSP '02). IEEE International Conference on, vol. 4, pp. IV-3397-IV-3400, ISSN : 1520-6149.*

Kai-Kuang Ma, Gang Qiu, "An improved adaptive rood pattern search for fast block-matching motion estimation in JVT/H.26L", Circuits and Systems, 2003. ISCAS '03. Proceedings of the 2003 International Symposium on, May 25-28, 2003, vol. 2, pp. II-708-II-711, Print ISBN: 0-7803-7761-3.*

Xuan-Quang Banh, Yap-Peng Tan, "Adaptive dual-cross search algorithm for block-matching motion estimation", Consumer Electronics, IEEE Transactions on, May 2004, vol. 50 , No. 2, pp. 766-775, ISSN : 0098-3063.*

Wei Zhenyu, Jiang Baochen, Zhang Xudong, Chen Yu, "A new full-pixel and sub-pixel motion vector search algorithm for fast block-matching motion estimation in H.264", Image and Graphics, 2004. Proceedings. Third International Conference on, Dec. 18-20, 2004, pp. 345-348, print ISBN: 0-7695-2244-0.*

'Adaptive Rood Pattern Search for Fast Block-Matching Motion Estimation' Nie et al., IEEE Transactions on Image Processing, vol. 11, No. 12, Dec. 2002, pp. 1442-1449.

* cited by examiner

FIG. 7
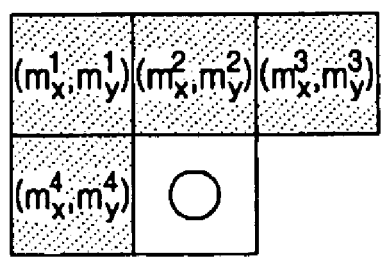
(a)
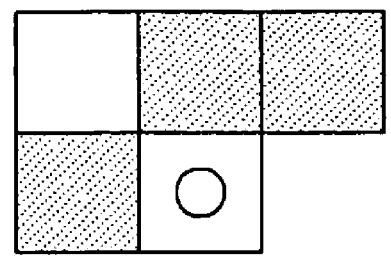
(b)
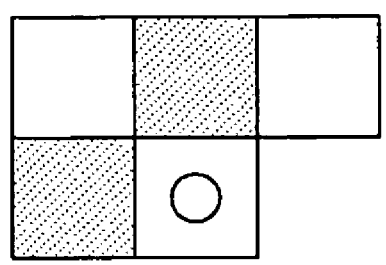
(c)
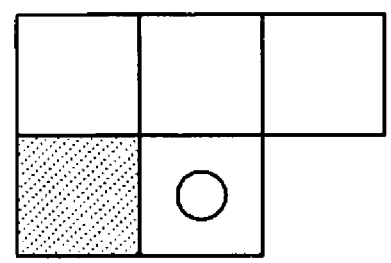
(d)
◯ : CURRENT BLOCK
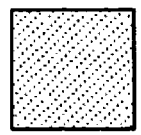 : REGION OF SUPPORT FOR MOTION PREDICTION

UNIT-SIZE ROOD PATTERN

FIG. 12
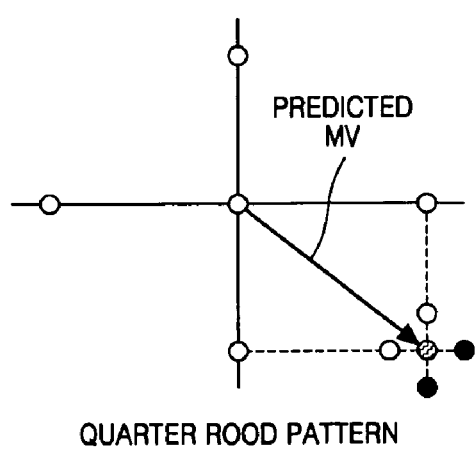
QUARTER ROOD PATTERN
(QRP-1)
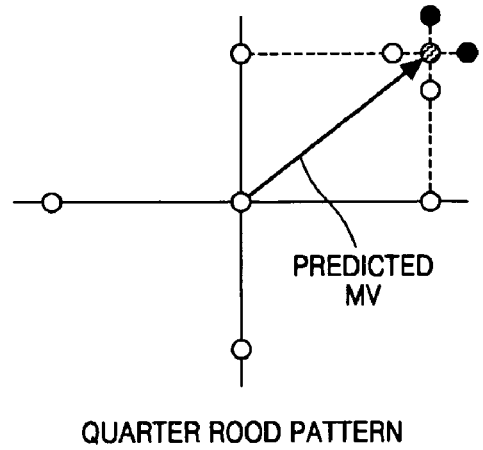
QUARTER ROOD PATTERN
(QRP-2)
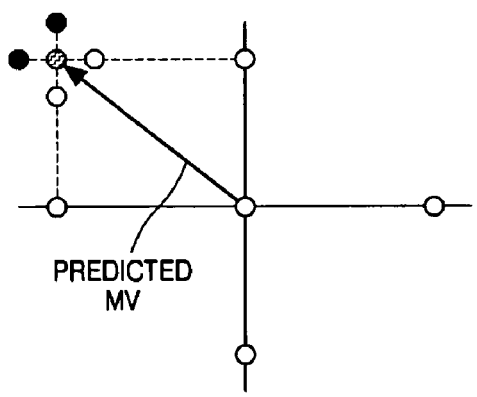
QUARTER ROOD PATTERN
(QRP-1)
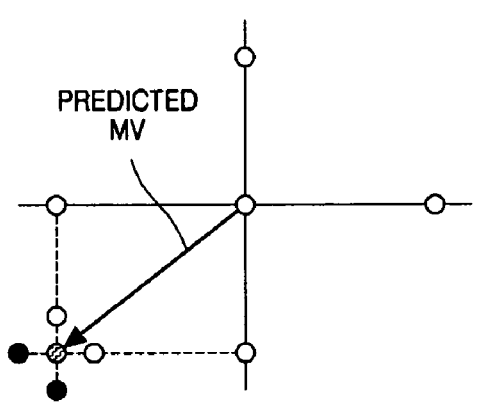
QUARTER ROOD PATTERN
(QRP-2)
⊘ BEST POINT AT SEARCHING TIME k
● CHECKING POINTS AT TIME (k+1)

FAST MOTION ESTIMATION APPARATUS AND METHOD USING BLOCK MATCHING ALGORITHM

CROSS-REFERENCE TO RELATED PATENT APPLICATION

This application claims the benefit of Korean Patent Application No. 10-2005-0051088, filed on 14 Jun. 2005, in the Korean Intellectual Property Office, the disclosure of which is incorporated herein in its entirety by reference.

BACKGROUND OF THE INVENTION

1. Field of the Invention

The present invention relates to a fast motion estimation apparatus and method for compressing video image data in real time using a block matching algorithm, and more particularly, to a fast motion estimation apparatus and method in which motion estimation is carried out by detecting a reference block corresponding to a predetermined block of a current frame of video image data from a plurality of blocks of a previous frame of the video image data included in a search range window.

2. Description of the Related Art

In a block matching algorithm, which is a motion estimation method widely used in various video compression technologies, a current frame of video image data is divided into a plurality of reference blocks, a plurality of reference blocks of a previous block of the video image data that match the respective reference blocks of the current frame are detected from a search range window for the previous frame, the displacements of the reference blocks from the previous frame to the current frame are determined as respective corresponding motion vectors, and the motion vectors and differences between pixel values of the reference blocks of the current frame and the reference blocks of the previous frame are transmitted.

A full search algorithm is a type of block matching algorithm. In the full search algorithm, each of a plurality of reference blocks of a current frame is compared with all of a plurality of blocks within a predetermined search region of a previous frame. The full search algorithm provides block matching with high precision and a simple data flow. In addition, the structure of a control circuit used for executing the full search algorithm is relatively simple. However, the full search algorithm requires a considerable amount of computation, especially when the search region becomes large.

In order to solve problems with the full search algorithm, various fast pattern search methods have been suggested. In most conventional fast pattern search methods, a search pattern is determined taking advantage of the characteristics of a distribution of motion vectors, thereby enhancing the speed of motion estimation. Particularly, a conventional adaptive rood search pattern search method is known to provide a higher motion estimation speed with less picture quality deterioration than other conventional fast pattern search methods.

In the conventional adaptive rood search pattern search method, two unit-size rood search patterns are used. The search may be repeatedly carried out using a unit-size rood search pattern, for example, a diamond search pattern, in a refined search stage.

However, in the conventional adaptive rood search pattern search method, when a video sequence includes much movement, the refined search may be trapped in a local minimum, thus deteriorating the quality of pictures.

FIG. 1 is a diagram illustrating the trapping of a final point of search in a local minimum when determining a motion vector using a conventional adaptive rood search pattern search method. Referring to FIG. 1, a first search iteration is carried out near an origin $O^0$ using an initial search pattern (◯), and a minimal point obtained in the first search iteration is determined as an origin $O^1$ for a second search iteration. Thereafter, the second search iteration is carried out on pixels (□) near the origin $O^1$ using a unit-size rood search pattern. Thereafter, a minimum point obtained in the second search iteration is determined as an origin $O^2$ for a third search iteration, and the third pixel search is carried out on pixels near the origin $O^2$. In the end, the search is trapped in a local minimum (●). In this case, a video sequence may be compressed with large error components, thus deteriorating the quality of pictures provided by a video codec. Thus, it is necessary to develop a motion estimation technique capable of preventing a final point of search from being trapped in a local minimum.

SUMMARY OF THE INVENTION

The present invention provides a fast motion estimation apparatus and method in which a search speed can be enhanced without deteriorating the quality of pictures using an improved adaptive rood search pattern search method and video image data can be efficiently compressed in real time by effectively reducing the number of points (hereinafter, referred to as search points) subjected to an search iteration to obtain an optimal motion vector point using an adaptive search length setting method and the uni-modal distortion surface assumption.

According to an aspect of the present invention, there is provided a fast motion estimation method. The fast motion estimation method includes: determining whether a sum of absolute differences (SAD) between pixel values of a current block of a current frame and a corresponding matching block of a previous frame is greater than a predefined threshold; performing an initial search when the SAD is greater than the predetermined threshold to find which search point of a current search pattern is the minimal SAD point and to determine whether the minimal SAD point matches the center of the current search pattern; and performing an iteration search when the minimal SAD point differs from the center of the current search pattern to reset the minimal SAD point to be a center of the current search pattern and to set a number of search points and the size of a search pattern based on from current search pattern to a center of the search window of the previous frame.

According to another aspect of the present invention, there is provided a fast motion estimation apparatus. The fast motion estimation apparatus includes: a determination unit which determines whether an SAD between pixel values of a current block of a current frame and a corresponding matching block of a previous frame is greater than a predefined threshold; an initial search unit which performs an initial search when the SAD is greater than the predetermined threshold to find which search point of a current search pattern is the minimal SAD point and to determine whether the minimal SAD point matches the center of the current search pattern; and a repetitive search unit which performs an iteration search when the minimal SAD point differs from the center of the current search pattern to reset the minimal SAD point to be a center of the current search pattern and to set a number of search points and the size of a search pattern based on from current search pattern to a center of the search window of the previous frame.

As the total number of search iteration iterations increases, the repetitive search unit may gradually reduce the size of a search pattern, but not below a predetermined critical value.

According to another aspect of the present invention, there is provided a computer-readable recording medium storing a computer program for executing the fast motion estimation method.

BRIEF DESCRIPTION OF THE DRAWINGS

The above and other features and advantages of the present invention will become more apparent by describing in detail exemplary embodiments thereof with reference to the attached drawings in which:

FIGS. 7A through 7D are diagrams illustrating 4 types of motion estimation of a current block using block information of blocks adjacent to the current block;

FIG. 12 is a diagram illustrating 4 types of quarter current search patterns;

DETAILED DESCRIPTION OF THE INVENTION

Figure 1:
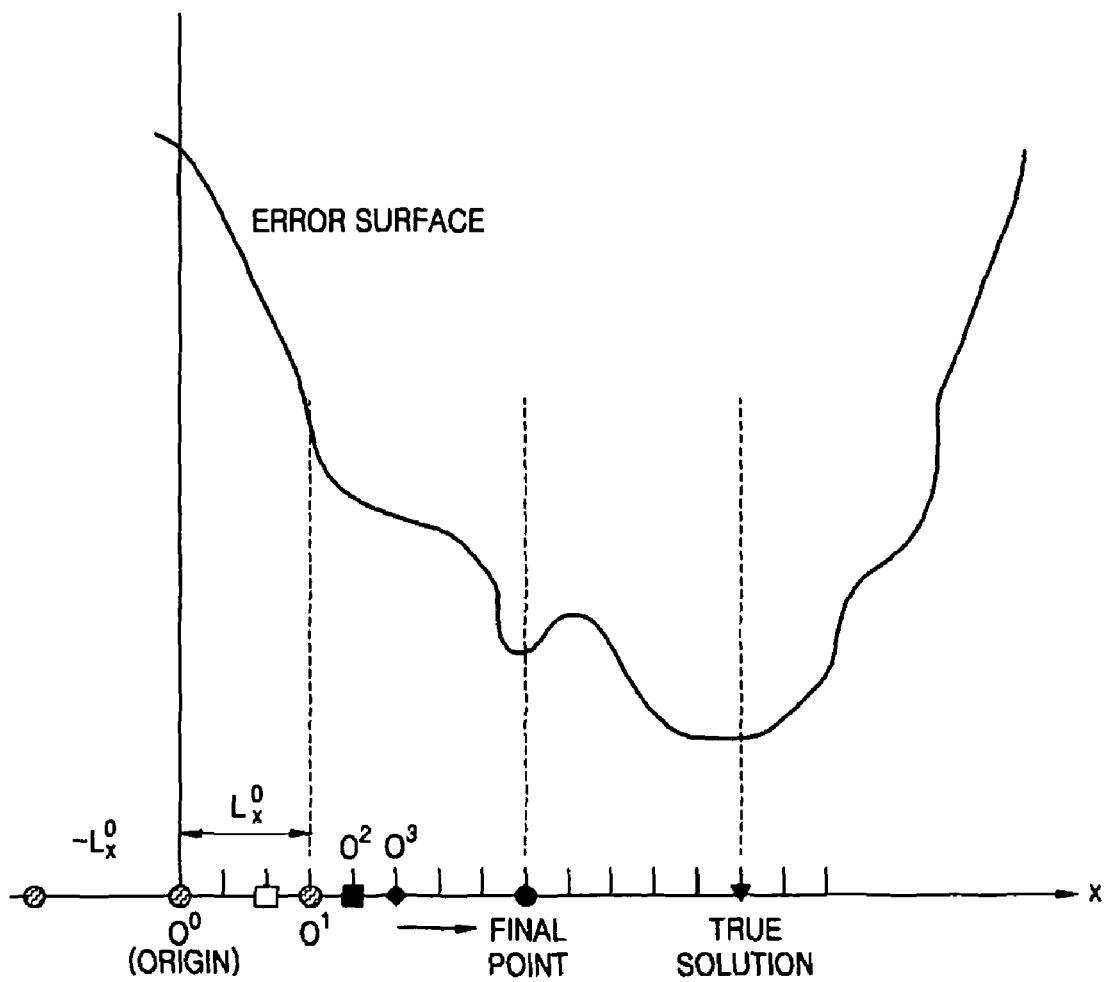
FIG. 1 is a diagram illustrating the trapping of a final point of search in a local minimum when determining a motion vector using a conventional adaptive rood search pattern search method.

The present invention will now be described more fully with reference to the accompanying drawings in which exemplary embodiments of the invention are shown. In the drawings, like reference numerals represent like elements.

Figure 2:
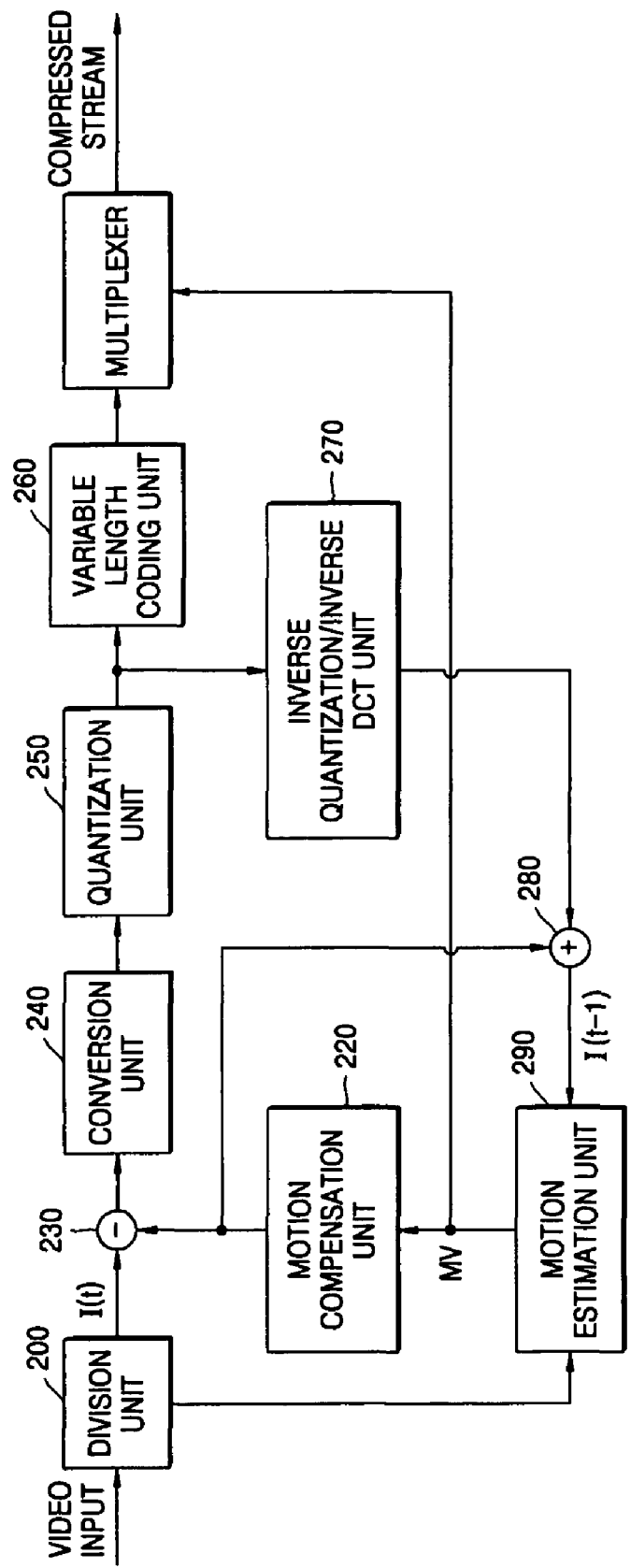
FIG. 2 is a block diagram of a typical video encoder using a motion estimation method.

FIG. 2 is a block diagram of a typical video encoder using a motion estimation method. A conventional method of compressing an input video signal will now be described in detail with reference to FIG. 2.

Referring to FIG. 2, a division unit 200 divides each of a plurality of frames of the input video signal into a plurality of blocks.

A subtraction unit 230 subtracts an output of a motion compensation unit 220 from a current frame, and the subtracted result is transmitted to a discrete cosine transformation unit 240. The discrete cosine transformation unit 240 performs a discrete cosine transformation operation on the subtracted result. Thereafter, a plurality of coefficients obtained by the discrete cosine transformation unit 240 are quantized by a quantization unit 250.

A variable length coding unit 160 generates a compressed stream based on the quantized coefficients. An inverse quantization/inverse discrete cosine transformation unit 270 and an addition unit 280 restore original image data of a previous frame from the quantized coefficients. Thereafter, a motion estimation unit 290 estimates or predicts movement of the current frame based on the restored original image data of the previous frame.

Figure 3:
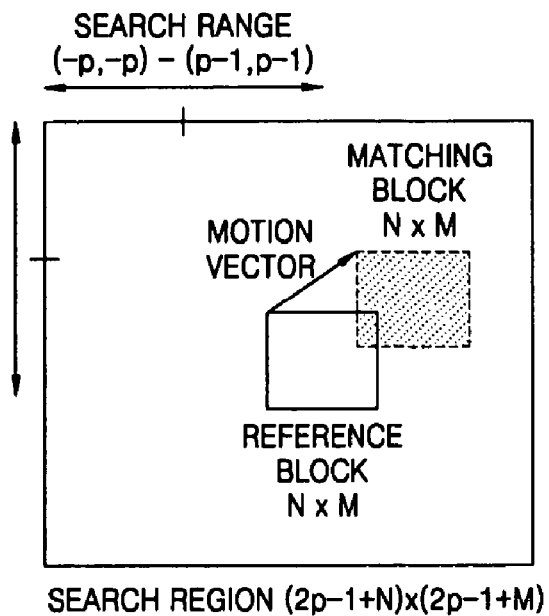
FIG. 3 is a diagram illustrating a block matching algorithm.

FIG. 3 is a diagram illustrating a block matching algorithm. Referring to FIG. 3, in the block matching algorithm, a current frame is divided into N×M blocks (hereinafter referred to as reference blocks), the reference blocks are compared with blocks in respective corresponding range windows (hereinafter referred to as the search ranges) within a distance of −P to +(P−1) pixels vertically or horizontally from the reference blocks, best matches (hereinafter referred to as matching blocks) for the reference blocks are found based on the comparison results, and the displacements of the matching blocks from the reference blocks are determined to be respective corresponding motion vectors. This type of motion estimation technique aims at reducing the amount of data to be transmitted by eliminating correlations between the current frame and the previous frame.

Figure 4:
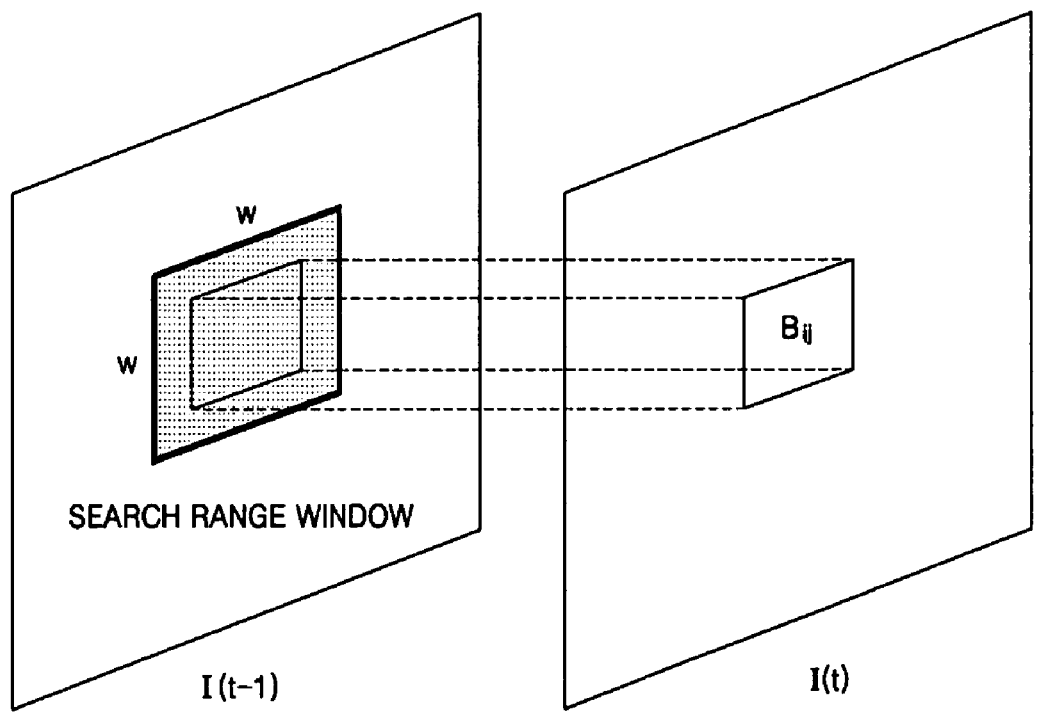
FIG. 4 is a diagram illustrating a search range window in a previous frame I(t−1) for a block Bi(t) of a current frame I(t)

FIG. 4 is a diagram illustrating a search range window in a previous frame I(t−1) for a block Bi(t) of a current frame I(t).

Figure 5:
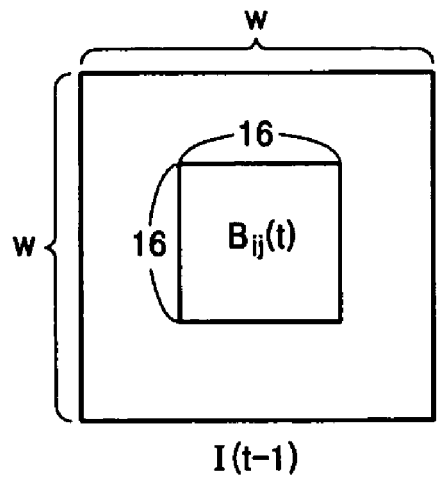
FIG. 5 is a diagram illustrating a 15×15 search range window.

FIG. 5 is a diagram illustrating a 15×15 search range window.

Figure 6:
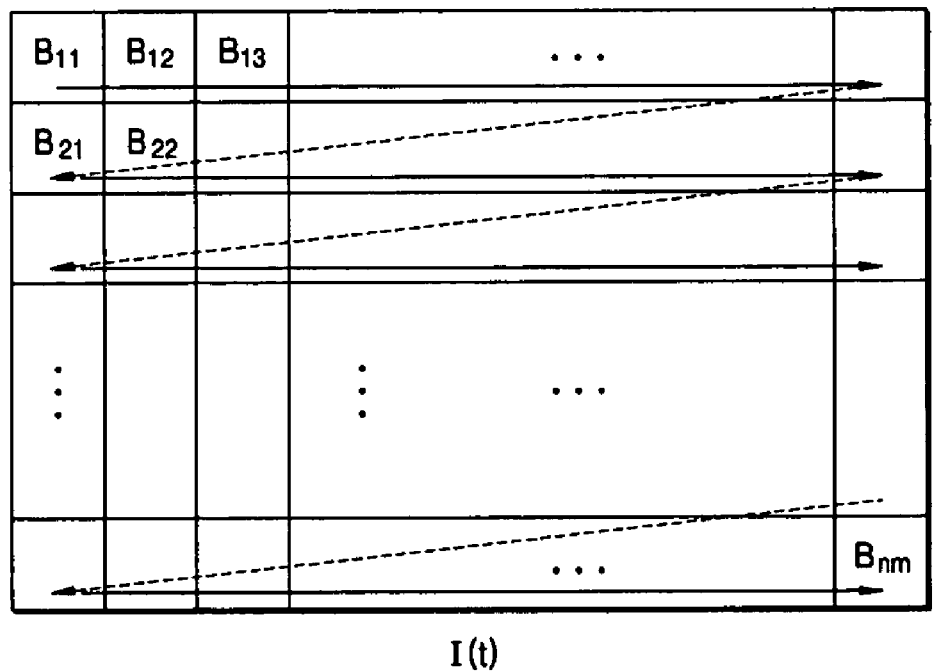
FIG. 6 is a diagram illustrating an order in which a video codec processes a plurality of 16×16 blocks into which an arbitrarily input frame is divided by a division unit 200.

FIG. 6 is a diagram illustrating an order in which a video codec processes a plurality of 16×16 blocks into which an arbitrarily input frame is divided by the division unit 200.

A video compression system processes video image data in units of blocks. FIG. 6 illustrates a sequential search method. Referring to FIG. 6, a plurality of blocks of a frame are sequentially scanned from the left to the right in the order of $B_{11}$, $B_{12}$, . . . , and $B_{nm}$ as indicated by arrows, thereby compressing data of the frame.

FIGS. 7A through 7D are diagrams illustrating 4 types of motion estimation of a current block using block information of blocks adjacent to the current block.

In the sequential search method illustrated in FIG. 6, it is determined in what location of an image frame a current block is expected to be detected based on motion information detected from upper left blocks of the current block through scanning.

4 different types of motion-estimating a current block of an image frame based on motion vectors of blocks adjacent to the current block are illustrated in FIGS. 7A through 7D.

Referring to FIG. 7A, the current block may be motion-estimated with reference to a motion vector $(mv_x^p, mv_y^p)$ of each of three blocks $(m_x^1, m_y^1)$, $(m_x^2, m_y^2)$ and $(m_x^3, m_y^3)$ above the current block and a block $(m_x^4, m_y^4)$ to the left of the current block.

Referring to FIG. 7B, the current block may be motion-estimated with reference to the motion vector $(mv_x^p, mv_y^p)$ of each of the blocks $(m_x^2, m_y^2)$, $(m_x^3, m_y^3)$, and $(m_x^4, m_y^4)$.

In an embodiment of the present invention, an estimated motion vector of a current block is obtained by calculating a median or an average of the motion vectors of blocks adjacent to the current block.

In a case where a median of the motion vectors of blocks adjacent to a current block is determined as an estimated motion vector of the current block, the size of a search pattern used in an initial iteration of a search may be calculated as indicated in Equation (1):

$$L_x^0 = mv_x^p = \text{Median}\{mv_x^i\} \, i=1, 2, 3, 4$$
$$L_y^0 = mv_y^p = \text{Median}\{mv_y^i\} \, i=1, 2, 3, 4 \quad (1)$$

The number of motion vectors of blocks adjacent to the current block that can be used in a median function may vary depending on which of the blocks adjacent to the current block are referenced in estimating the motion vector of the current block.

For example, if the motion estimation method illustrated in FIG. 7A is used, i may be 1, 2, 3, or 4. On the other hand, if the motion estimation method illustrated in FIG. 7B is used, i may be 2, 3, or 4.

Figure 8:
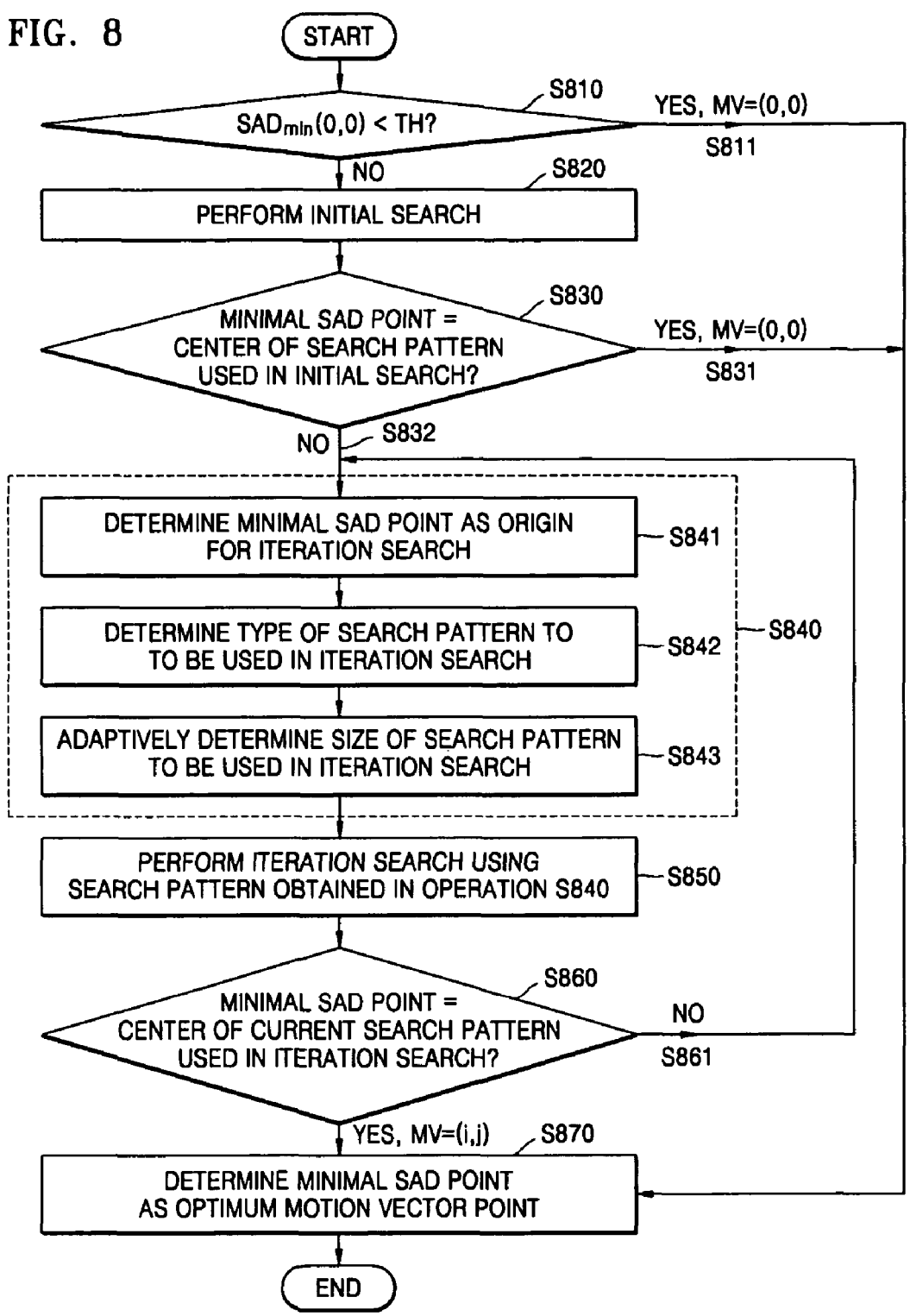
FIG. 8 is a flowchart illustrating a fast motion estimation method according to an exemplary embodiment of the present invention.

FIG. 8 is a flowchart illustrating a fast motion estimation method according to an exemplary embodiment of the present invention. Referring to FIG. 8, in operation S810, a sum of absolute differences (SAD) between pixel values of a current block of a current frame and pixel values of a corresponding matching block detected from a search range window in a previous frame is compared with a predefined threshold Th. The SAD may be calculated as indicated in Equation (2):

$$SAD_{xy} = \sum_{i=0}^{16} \sum_{j=0}^{16} |B_c(i,j) - B_r(i,j)| \quad (2)$$

where $B_c(i, j)$ is a pixel of the current block, and $B_r(i, j)$ is a pixel of the matching block.

If the SAD is smaller than the threshold Th, a current search origin is determined as being an optimal motion vector point in operation S870, and the fast motion estimation method is complete. In other words, the current frame is determined as being a motionless image frame.

However, if the SAD is greater than the threshold value Th, in operation S820, it is determined that there is movement of an object or a background portion between the current frame and the previous frame, and an initial search is performed.

Figure 10:
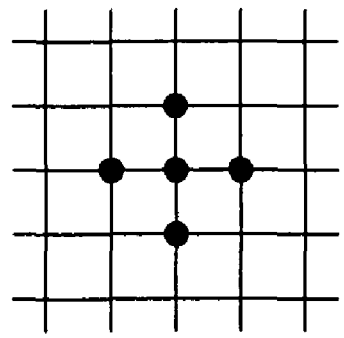
FIG. 10 is a diagram illustrating a unit-size rood search pattern used in an adaptive rood search pattern search method.

In detail, for the initial search, a search pattern is created based on a predicted motion vector $(mv_x^p, mv_y^p)$ obtained using motion information regarding blocks near the current block, as illustrated in FIG. 10.

Thereafter, it is determined which of 6 points, including the current search origin, 4 points of a rood search pattern, and a predicted motion vector point, has the smallest SAD, i.e., which of the 6 points is a minimal SAD point.

In operation S870, if the minimal SAD point obtained in operation S820 is determined to match the current search origin, the current search origin is determined to be an optimal motion vector point in operation S830, and the fast motion estimation method is complete.

However, in operation S840, if the minimal SAD point obtained in operation S820 is determined not to match the current search origin in operation S830, the minimal SAD point obtained in operation S820 is determined as an origin for a subsequent search iteration, and a search iteration is performed.

Operation S840 includes operation S841 in which the current search origin is relocated, operation S842 in which the type of search pattern to be used for the search iteration is determined, and operation S843 in which the size of search pattern to be used for the search iteration is determined.

In detail, in operation S841, the minimal SAD point obtained in operation S820 is determined as the origin for the subsequent search iteration, i.e., the center of a search pattern to be used in the subsequent search iteration.

In operation S842, it is determined whether a quarter rood search pattern or a half rood search pattern is to be chosen as the search pattern to be used in the subsequent search iteration with reference to the location of the minimal SAD point obtained in operation S820 relative to the center of the search pattern used in the initial search.

In other words, in operation S842, it is determined whether the quarter rood search pattern or the half rood search pattern is to be chosen as the search pattern to be used in the subsequent search iteration with reference to the location of the minimal SAD point obtained in operation S820 relative to the center of the search pattern used in the initial search based on the uni-modal distortion surface assumption that the farther a search point is away from an optimal motion vector point, the greater the error of the search point. Operation S842 will be described later in further detail.

In operation S843, the size of the search pattern chosen in operation S842 is determined. In other words, in the present embodiment, a search pattern to be used in a search iteration can be adaptively determined, while conventionally, a unit-size rood search pattern whose size is fixed is used. The size of the search pattern chosen in operation S842 may be determined as indicated in Equations (3) through (5):

$$L_x^{k+1} = \langle \rho | O_x^{k+1} - O_x^k | \rangle = \langle \rho L_x^k \rangle$$
$$L_y^{k+1} = \langle \rho | O_y^{k+1} - O_y^k | \rangle = \langle \rho L_y^k \rangle \quad (3)$$

where $L_x^{k+1}$ and $L_y^{k+1}$ are the lengths of a search pattern to be used in a (k+1)-th search iteration in x- and y-directions, respectively, $L_x^k$ and $L_y^k$ are the lengths of a search pattern used in a k-th search iteration in the x- and y-directions, respectively, $O_x^k$ is the x-component of the center of the search pattern used in the k-th search iteration, $O_x^{k+1}$ is the x-component of the center of the search pattern to be used in the (k+1)-th search iteration and is also the x-component of a minimal SAD point obtained in the k-th search iteration, < > is a function for rounding a value to the closest integer greater than the original value and is used for determining the size of a search pattern in units of pixels, and ρ is a weight used to determine how much the size of the search pattern to be used in the (k+1)-th search iteration is reduced from the size of the search pattern used in the k-th search iteration.

The weight ρ satisfies Inequality (4):

$$0 < \rho < 1 \quad (4)$$

If the weight ρ is greater than 1, the size of the search pattern to be used in the (k+1)-th search iteration may be greater than the size of the search pattern used in the k-th search iteration, and thus, the number of search points may increase, thereby making it difficult to enhance the speed of motion estimation. On the other hand, if the weight ρ is smaller than 0, the size of a search pattern may always be the same as a unit-size rood search pattern, thus making it impossible to provide a search pattern whose size can be adaptively determined.

Therefore, in order to provide a search pattern whose size can be adaptively determined, the weight ρ must be determined to satisfy Inequality (4). Various experimental results show that the weight ρ can be within the range of 0.6 to 0.7.

In other words, in a search iteration other than a final search iteration, a video sequence with large movements may be processed not by using a unit-size rood search pattern having a size of 1 but by using a search pattern whose size can be adaptively set to an integer value between the size of a search pattern used in an initial search and the size of a unit-size rood search pattern having a size of 1 as indicated in Equations (3) and (4). As a total number of search iteration iterations increases, the size of a search pattern gradually converges to 1, and a final search iteration is carried out using a unit-size search pattern having a size of 1.

Therefore, the size of the search pattern used in the k-th search iteration must be determined to satisfy Inequality (5):

$$L_x^k \leq 1$$
$$L_y^k \leq 1 \quad (5)$$

In operation S850, a minimal SAD point is searched for using the search pattern whose type and size are determined in operation S840. In operation S860, it is determined whether the minimal SAD point obtained in operation S850 matches the center of the search pattern used in operation S850. In operation S870, if the minimal SAD point obtained in operation S850 is determined in operation S860 to match the center of the search pattern used in operation S850, the minimal SAD point obtained in operation S850 is determined to be a final motion vector point, and the fast motion estimation method is complete.

However, if the minimal SAD point obtained in operation S850 is determined in operation S860 not to match the center of the search pattern used in operation S850, the fast motion estimation method returns to operation S841.

Figure 9:
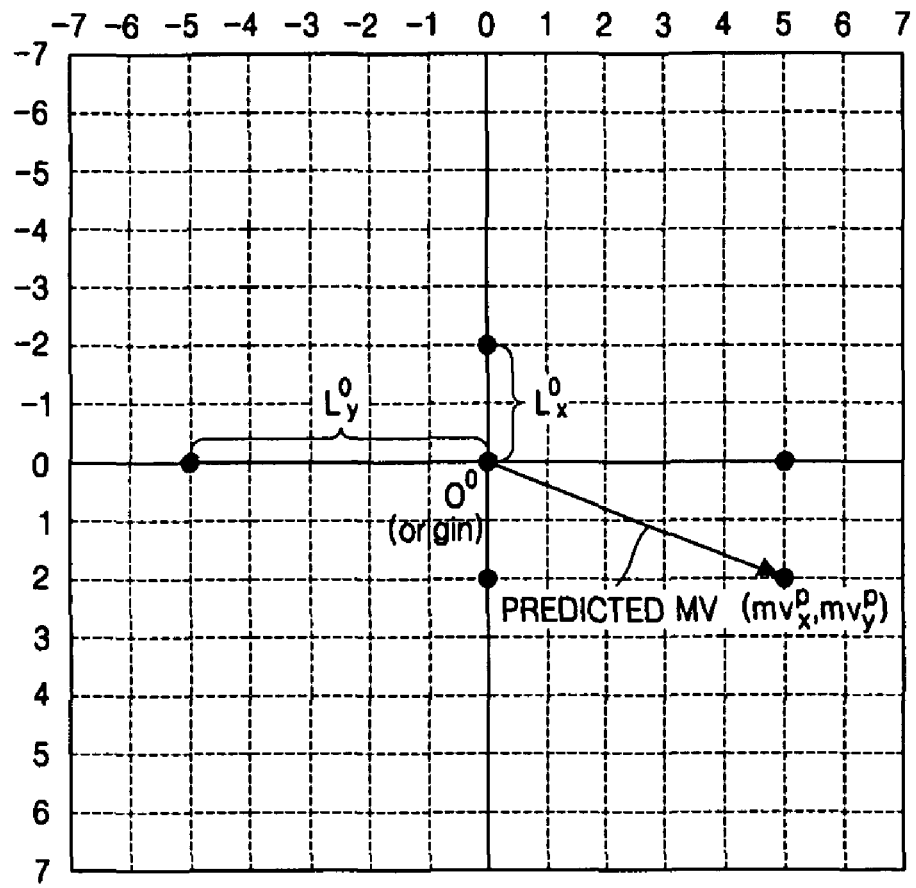
FIG. 9 is a diagram illustrating a search pattern used in an initial search in an adaptive rood search pattern search method.

FIG. 9 is a diagram illustrating a search pattern used in an initial search in an adaptive rood search pattern search method.

FIG. 10 is a diagram illustrating a unit-size rood search pattern used in an adaptive rood search pattern search method.

Figure 11:
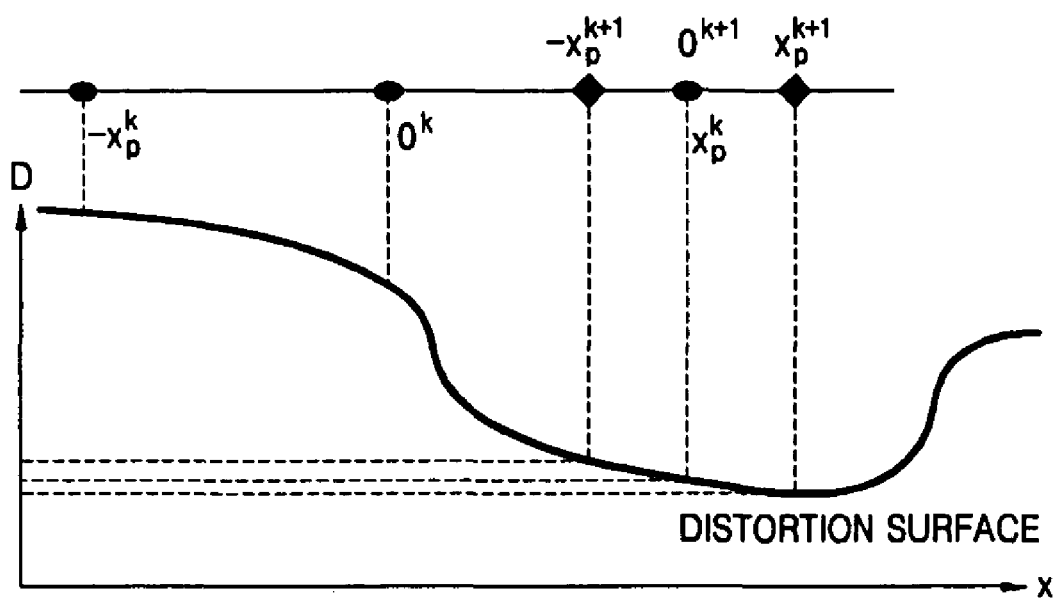
FIG. 11 is a diagram illustrating one-dimensionally a method of reducing the number of search points used based on the uni-modal distortion surface assumption according to an exemplary embodiment of the present invention.

FIG. 11 is a diagram one-dimensionally illustrating a method of reducing the number of search points used based on the uni-modal distortion surface assumption according to an exemplary embodiment of the present invention. Referring to FIG. 11, if a point $x_p^k$ is a minimal SAD point obtained in a k-th search iteration, one of two points $-x_p^{k+1}$ and $x_p^{k+1}$ at either side of the point $x_p^k$ (particularly, the point $-x_p^{k+1}$) may not be subjected to a (k+1)-th search iteration.

Figure 13:
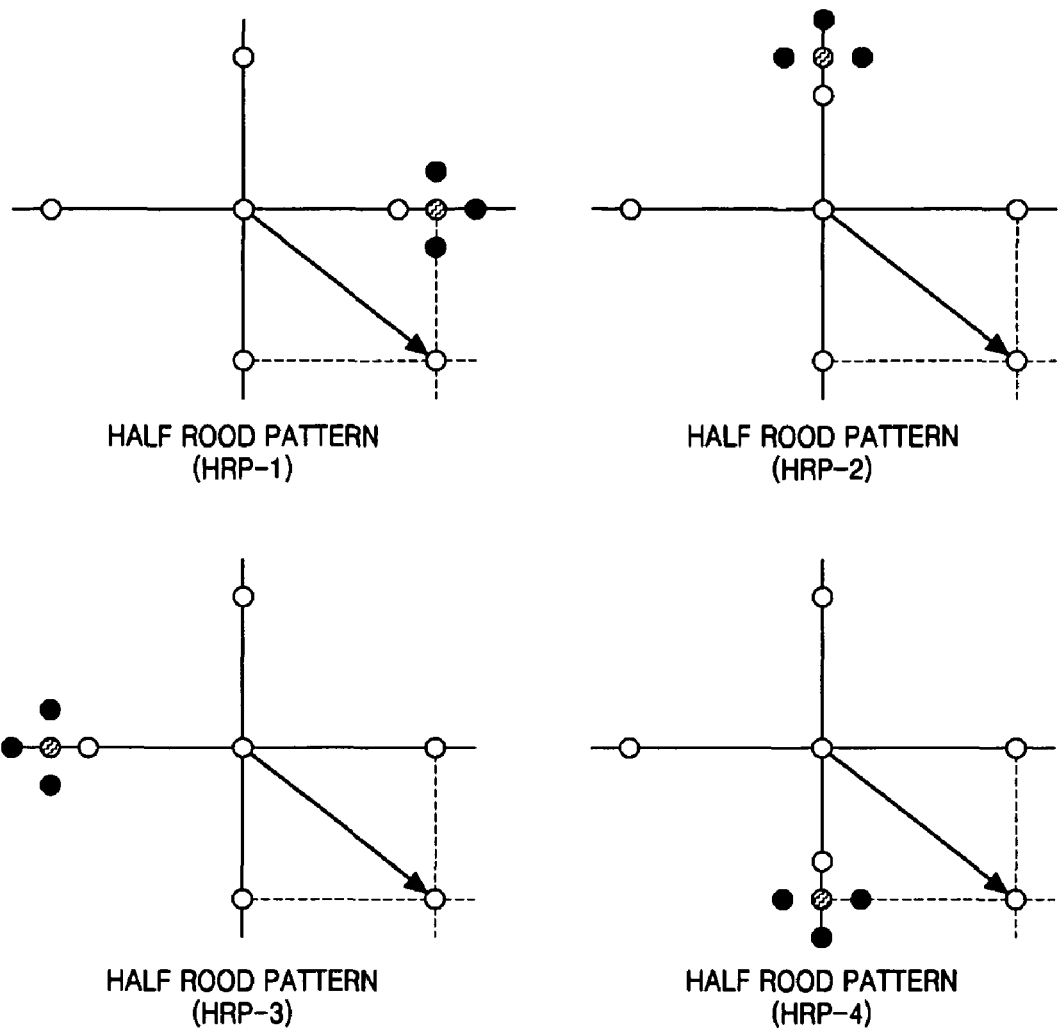
FIG. 13 is a diagram illustrating 4 types of half current search patterns.

The reduction in the number of search points is also illustrated two-dimensionally in FIGS. 12 and 13.

In other words, the number of search points can be reduced by subjecting only a small number of points to a search iteration for an optimal motion vector point in consideration of the direction in which an error decreases. A reduction in the number of search points leads to a reduction in the amount of time required for motion estimation in a video codec and also leads to an improvement in the speed of motion estimation.

FIG. 12 is a diagram illustrating 4 types of quarter rood search patterns.

FIG. 13 is a diagram illustrating 4 types of half rood search patterns.

Referring to FIG. 8, in operation S842, it is determined whether a quarter rood search pattern or a half rood search pattern is to be chosen as the search pattern for the subsequent search iteration with reference to the location of the minimal SAD point obtained in the initial search relative to the center of the search pattern used in the initial search.

Conventionally, all 4 points of a rood search pattern, which are located at the left, right, top, and bottom of the rood search pattern, are used as search points. However, in the present embodiment, only some of the 4 points are used as search points with the aid of a quarter rood search pattern or a half rood search pattern. Therefore, it is possible to reduce the number of search points by an average of 2 to 3 for each search iteration.

Figure 14:
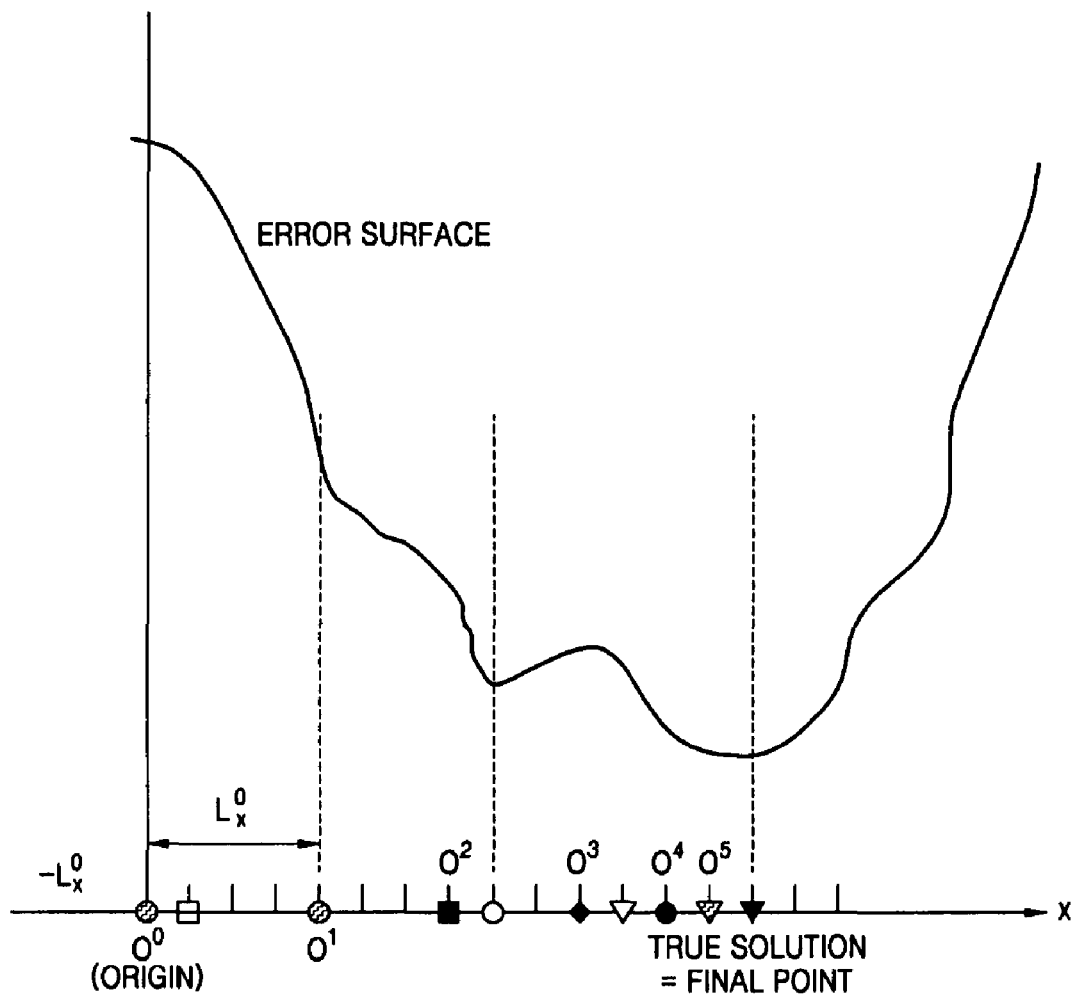
FIG. 14 is a diagram one-dimensionally illustrating a method of searching for an optimal motion vector point by adjusting the length of a search pattern according to an exemplary embodiment of the present invention.

FIG. 14 is a diagram one-dimensionally illustrating a method of searching for an optimal motion vector point by adjusting the length of a search pattern according to an exemplary embodiment of the present invention. In the adaptive rood search pattern search method according to an exemplary embodiment of the present invention, the size of a search pattern decreases as the number of search iterations increases, instead of remaining constant, in order to efficiently handle a sequence of frames with large movement. Therefore, as illustrated in FIG. 14, an optimal solution (▼) can be obtained by sequentially moving a current search origin from $O^1$ to $O^2$, from $O^2$ to $O^3$, from $O^3$ to $O^4$, and from $O^4$ to $O^5$.

Therefore, by using the adaptive rood search pattern search method according to an exemplary embodiment of the present invention, it is possible to enhance the quality of pictures by compressing each block with a smallest error. The adaptive rood search pattern search method according to an exemplary embodiment of the present invention is expanded two-dimensionally.

Figure 15:
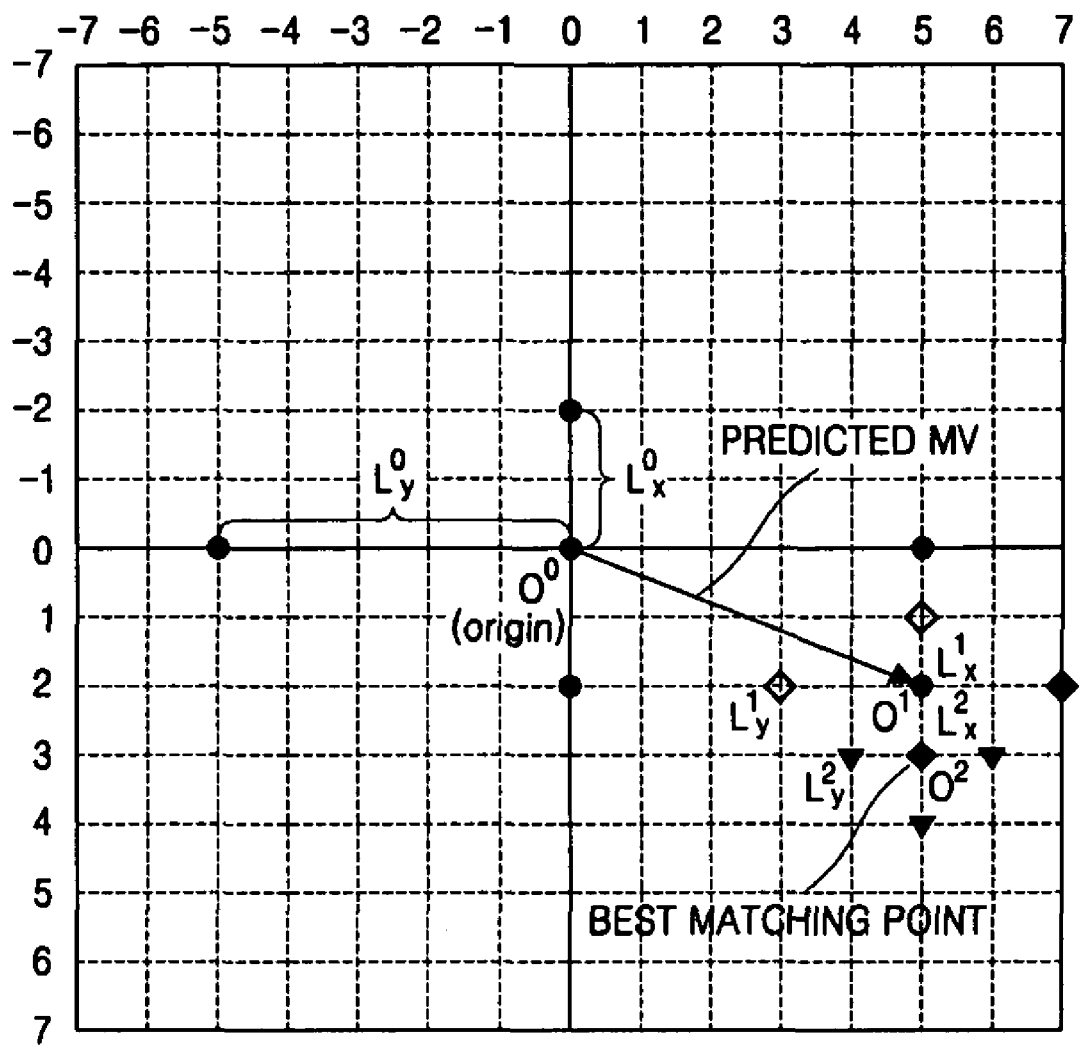
FIG. 15 is a diagram illustrating two-dimensionally a method of determining a motion vector using an improved adaptive rood search pattern search method according to an exemplary embodiment of the present invention.

FIG. 15 is a diagram illustrating a method of determining a motion vector using an improved adaptive rood search pattern search method according to an exemplary embodiment of the present invention.

A fast motion estimation method using the improved adaptive rood search pattern method according to an exemplary embodiment of the present invention will now be described in detail with reference to FIG. 15. Referring to FIG. 15, in an initial search, an SAD at an origin $O^0$ (0, 0) is calculated, as indicated in Equation (2). If the SAD is smaller than a threshold TH, the origin $O^0$ is determined to be a motion vector point. Otherwise, however, a search iteration is carried out using a search pattern whose size is determined as indicated in Equation (3).

In detail, a total of 6 points (●), including the origin $O^0$, 4 search points of a rood search pattern, and a predicted vector point, are chosen as search points. Thereafter, an SAD of each of the 6 search points is calculated, and the search point that is determined to be a minimal SAD point, for example, the predicted vector point, is determined as an origin $O^1$ for a first search iteration.

Assuming that $\rho=0.6$, the size of a search pattern to be used in the first search iteration is determined as indicated in Equation (6):

$$(L_x^1, L_y^1) = ( <0.6 \times |O_x^0 - O_x^1|>, \ <0.6 \times |O_y^0 - O_y^1|>) \quad (6)$$
$$= ( <3.0>, \ <1.2>)$$
$$= (3, 1).$$

Of 4 points surrounding the origin $O^1$, only the 2 points illustrated as black diamonds (◆) (i.e., points corresponding to a quarter rood search pattern) are chosen as search points for the first search iteration. Thereafter, the point that is determined to be a minimal SAD point through the first search iteration is determined as an origin $O^2$ for a second search iteration. If the minimal SAD point obtained in the first search iteration matches the origin of the search pattern used in the first search iteration, the minimal SAD point obtained in the first search iteration is determined to be an optimal motion vector point. Otherwise, however, the second search iteration is carried out.

The size of a search pattern to be used in the second search iteration is determined as indicated in Equation (7):

$$(L_x^2, L_y^2) = (\langle 0.6 \times |O_x^1 - O_x^2| \rangle, \langle 0.6 \times |O_y^1 - O_y^2| \rangle) \quad (7)$$
$$= (\langle 1.8 \rangle, \langle 0.6 \rangle)$$
$$= (1, 1).$$

Thereafter, 3 points illustrated as black triangles (▼) surrounding the origin $O^2$, i.e., 3 points corresponding to a half rood search pattern, are chosen as search points for the second search iteration. One of the 3 points that is determined to be a minimal SAD point through the second search iteration is determined to be an origin for a third search iteration. If the minimal SAD point obtained in the second search iteration matches the origin of the search pattern used in the second search iteration, the minimal SAD point obtained in the second search iteration is determined to be an optimal motion vector point. Otherwise, the third search iteration is carried out.

Figure 16:
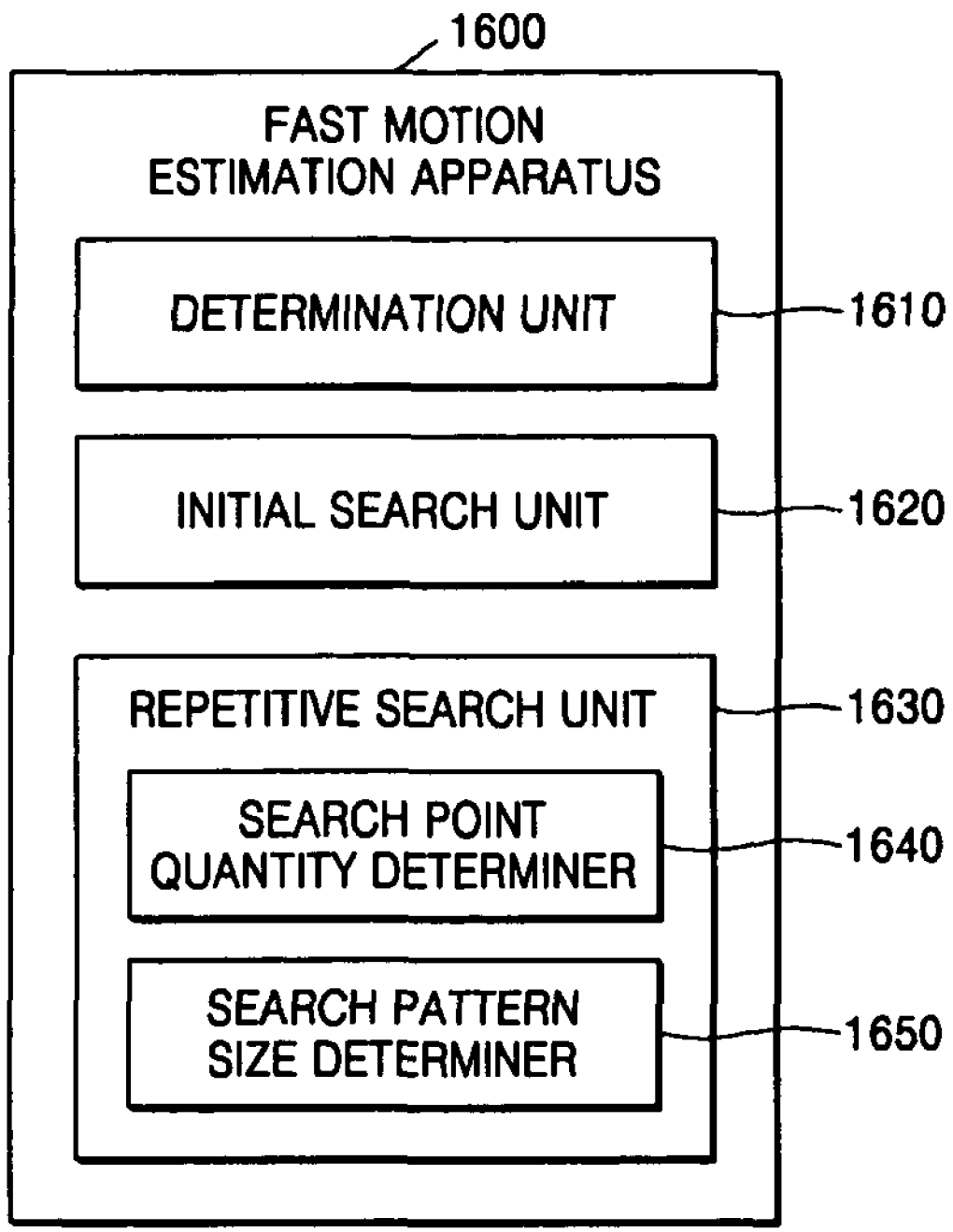
FIG. 16 is a block diagram of a fast motion estimation apparatus according to an exemplary embodiment of the present invention.

FIG. 16 is a block diagram of a fast motion estimation apparatus 1600 according to an exemplary embodiment of the present invention. Referring to FIG. 16, the fast motion estimation apparatus 1600 includes a determination unit 1610, an initial search unit 1620, and a repetitive search unit 1630. The repetitive search unit 1630 includes a search point quantity determiner 1640 and a search pattern size determiner 1650. The search point quantity determiner 1640 determines a number of search points for a search iteration according to the location of the center of a current search pattern relative to the center of a search range window of a previous frame.

The determination unit 1610 calculates an SAD between pixel values of a current block of a current frame and pixel values of a corresponding matching block of the previous frame and compares the SAD with a predefined threshold Th.

If the SAD is smaller than the threshold Th, the center of the search window range is determined to be an optimal motion vector point, and the motion estimation operation is complete.

On the other hand, if the SAD is greater than the threshold Th, the initial search unit 1620 determines that there is movement of an object or a background portion between the current frame and the previous frame and performs an initial search by choosing 6 points, including the origin of the current search range window, 4 points of a rood search pattern, and a predicted motion vector point, as search points, and extracting the point that is determined to be a minimal SAD point. If the minimal SAD point obtained in the initial search matches the center of the current search pattern, the center of a search pattern used in the initial search is determined to be an optimal motion vector point, and the motion estimation operation is complete.

However, if the minimal SAD point obtained in the initial search does not match the center of the search pattern used in the initial search, the repetitive search unit 1630 relocates a current search origin to the minimal SAD point obtained in the initial search and performs a subsequent search iteration.

The search point quantity determiner 1640 chooses either a quarter rood search pattern or a half rood search pattern as a search pattern for the subsequent search iteration according to the location of the current search pattern relative to the center of the search range window.

In other words, according to the uni-modal distortion surface assumption that the farther a search point is away from an optimal motion vector, the larger the error of the search point, the search point quantity determiner 1640 chooses the quarter rood search pattern having 2 points as search points if the center of the current search pattern is located in the first, second, third, or fourth quadrant of an XY-plane whose origin is located at the center of the search range window of the previous frame, and chooses the half rood search pattern having 3 points as search points if the center of the current search pattern is located on the X-axis or the Y-axis of the XY plane.

The search pattern size determiner 1650 determines the size of a search pattern whose type is determined by the search point quantity determiner 1640 as indicated in Equations (3) through (5).

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to enhance the real-time compression efficiency of a video compression software system by improving the speed of motion estimation performed in units of blocks.

In addition, the present invention can be applied to other fast pattern search methods, such as 3SS, E3SS, and 4SS, and to conventional block-based MPEG video compression systems.

In the present invention, motion estimation is carried out in units of blocks with reference to motion information regarding a plurality of blocks adjacent to a current block of a current frame, either a half rood search pattern or a quarter rood search pattern is adaptively chosen as a search pattern, and the size of the chosen search pattern is adaptively adjusted for each search iteration. Thus, it is possible to effectively reduce the number of search points without deteriorating the quality of pictures.

In addition, it is possible to maintain high quality image data even with large movement by adaptively determining the shape and size of a search pattern to be used in a search iteration.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A computer implemented fast motion estimation method comprising:
   determining whether a sum of absolute differences (SAD) between pixel values of a current block of a current frame and a corresponding matching block of a previous frame is greater than a predefined threshold;
   performing an initial search when the SAD is greater than the predetermined threshold to find which search point of a current search pattern is the minimal SAD point and to determine whether the minimal SAD point matches the center of the current search pattern; and performing an iteration search when the minimal SAD point differs from the center of the current search pattern to reset the minimal SAD point to be a center of the current search pattern and to set a number of search points and the size of a search pattern based on from current search pattern to a center of the search window of the previous frame, wherein an SAD of a search point monotonously increases as the distance from an optimal motion vector increases, and in the setting of the number of search points, the SAD points that are predictably not the minimal SAD are excluded.

2. The computer implemented fast motion estimation method of claim 1, wherein the performing of an iteration search comprises, detecting a quarter rood search pattern including two search points if the center of the search pattern is located in the first, second, third, or fourth quadrant of an XY plane with an origin at the center of the search window of the previous frame;

detecting a half rood search pattern including two search points if the center of the search pattern is located on the X-axis or the Y-axis of the XY plane with an origin at the center of the search window of the previous frame.

3. The computer implemented fast motion estimation method of claim 1, wherein, in the performing of an iteration search, as the total number of search iterations increases, the size of a search pattern decreases, but not below a predetermined critical value.

4. The computer implemented fast motion estimation method of claim 1, wherein in the performing an iteration search, the size of a search pattern is $L_x^{k+1} = <\rho|O_x^{k+1} - O_x^k|> = <\rho L_x^k>$, $L_y^{k+1} = <\rho|O_y^{k+1} - O_y^k|> = <\rho L_y^k>$, wherein the size of a search pattern to be used in a (k+1)-th search iteration in the direction of an X-axis is determined by multiplying an absolute value of a difference between the x-component of a search pattern used in a k-th search iteration and the x-component of the center of the search pattern to be used in the (k+1)-th search iteration by a predetermined weight and rounding the multiplication result to a closest integer greater than or equal to the multiplication result, the predetermined weight being a value between 0 and 1; and the size of the search pattern to be used in the (k+1)-th search iteration in the direction of a Y-axis is determined by multiplying an absolute value of a difference between the y-component of the center of the search pattern used in the k-th search iteration and the y-component of the center of the search pattern to be used in the (k+1)-th search iteration by the predetermined weight and rounding the multiplication result to a closest integer greater than or equal to the multiplication result.

5. The computer implemented fast motion estimation method of claim 4, wherein the sizes of the search pattern used in the k-th search iteration in the x- and y-directions, respectively, satisfy the following inequalities:

$L_x^k \geq 1$; and $L_y^k \geq 1$.

6. A fast motion estimation apparatus comprising:

a determination unit which determines whether an SAD between pixel values of a current block of a current frame and a corresponding matching block of a previous frame is greater than a predefined threshold;

an initial search unit which performs an initial search when the SAD is greater than the predetermined threshold to find which search point of a current search pattern is the minimal SAD point and to determine whether the minimal SAD point matches the center of the current search pattern; and a repetitive search unit which performs an iteration search when the minimal SAD point differs from the center of the current search pattern to reset the minimal SAD point to be a center of the current search pattern and to set a number of search points and the size of a search pattern based on from current search pattern to a center of the search window of the previous frame, wherein an SAD of a search point monotonously increases as the distance from an optimal motion vector increases, and in the setting of the number of search points, the SAD points that are predictably not the minimal SAD are excluded.

7. The fast motion estimation apparatus of claim 6, wherein the search points comprise 4 points forming a diamond-shaped search pattern, the origin for the search iteration, and a motion-estimated point.

8. The fast motion estimation apparatus of claim 6, wherein the repetitive search unit uses a quarter rood search pattern having 2 points as search points, if the center of the search pattern used in the initial search is located in the first, second, third, or fourth quadrant of an XY plane whose origin is the center of the search range window of the previous frame, and uses a half rood search pattern having 3 points as search points if the center of the current search pattern is located on the X-axis or the Y-axis of the XY plane.

9. The fast motion estimation apparatus of claim 6, wherein, as the total number of search iteration iterations increases, the repetitive search unit gradually reduces the size of a search pattern, but not below a predetermined critical value.

10. The fast motion estimation apparatus of claim 6, wherein the size of a search pattern is $L_x^{k+1} = <\rho|O_x^{k+1} - O_x^k|> = <\rho L_x^k>$, $L_y^{k+1} = <\rho|O_y^{k+1} - O_y^k|> = <\rho L_y^k>$, wherein the repetitive search unit determines the size of a search pattern to be used in a (k+1)-th search iteration in the direction of an X-axis by multiplying an absolute value of a difference between the x-component of a search pattern used in a k-th search iteration and the x-component of the center of the search pattern to be used in the ($k_{+1}$)-th search iteration by a predetermined weight and rounding the multiplication result to a closest integer greater than or equal to the multiplication result, the predetermined weight being a value between 0 and 1; and determines the size of the search pattern to be used in the (k+1)-th search iteration in the direction of a Y-axis by multiplying an absolute value of a difference between the y-component of the center of the search pattern used in the k-th search iteration and the y-component of the center of the search pattern to be used in the (k+1)-th search iteration by the predetermined weight and rounding the multiplication result to a closest integer greater than or equal to the multiplication result.

11. The fast motion estimation apparatus of claim 10, wherein the sizes of the search pattern used in the k-th search iteration in the x- and y-directions, respectively, satisfy the following inequalities:

$L_x^k \geq 1$; and $L_y^k \geq 1$.

* * * * *